United States Patent [19]

Wolf

[11] 3,861,925
[45] Jan. 21, 1975

[54] ALKALI-RESISTANT, ZIRCONIA-FREE, FIBERIZABLE GLASS COMPOSITIONS

[75] Inventor: Warren W. Wolf, Reynoldsburg, Ohio

[73] Assignee: Owens-Corning Fiberglas Corporation, Toledo, Ohio

[22] Filed: Feb. 12, 1973

[21] Appl. No.: 331,725

[52] U.S. Cl.......................... 106/50, 106/52, 106/99
[51] Int. Cl.............................................. C03c 13/00
[58] Field of Search.................................. 106/50, 52

[56] References Cited
UNITED STATES PATENTS

| | | | |
|---|---|---|---|
| 2,566,134 | 8/1951 | Mockrin et al. | 106/52 |
| 2,640,784 | 6/1953 | Tiede | 106/50 |
| 3,385,915 | 5/1968 | Hamling | 106/50 X |
| 3,480,536 | 11/1969 | Arthur | 106/47 R |
| 3,573,078 | 3/1971 | Bacon | 106/50 |
| 3,783,092 | 1/1974 | Majumdar | 106/50 |

FOREIGN PATENTS OR APPLICATIONS

| 187,266 | 10/1966 | U.S.S.R. | 106/50 |
|---|---|---|---|
| 727,779 | 10/1942 | Germany | 106/50 |

OTHER PUBLICATIONS

Beals "Effects of Titanium Dioxide in Glass", Part Three, The Glass Industry, Nov. 1963, Vol. 44, pp. 625–29, 647,650.

Ram et al., Bull Central Gases & Ceram Research Inst. (India) 2, 170-8 (1955), "Influence of Titanium Dioxide on the Properties of alkali-lime-silica glesses I."

Kirk–Othmer (1963), Encyclopedia of Chemical Technology, Vol. 22, p. 653.

Primary Examiner—Helen M. McCarthy
Attorney, Agent, or Firm—Carl G. Staelin; John W. Overman; Patrick P. Pacella

[57] ABSTRACT

Alkali resistant, fiberizable glass compositions are disclosed. These compositions contain $TiO_2$, $La_2O_3$ or $CeO_2$. The glass fibers formed from these compositions are useful in the reinforcement of cementitious materials.

4 Claims, No Drawings

ALKALI-RESISTANT, ZIRCONIA-FREE, FIBERIZABLE GLASS COMPOSITIONS

This invention relates to fiberizable glass compositions. More particularly, this invention relates to glass fibers which are alkali resistant.

Until quite recently it has not been advisable to use glass fibers for long term (five or more years) reinforcement of cement, concrete, mortar or other cementitious materials or matrices that have a high alkali content. The harsh alkali environment would degrade the types of glass fibers, E glass for example, commonly used to reinforce non-alkali materials such as plastics.

E glass fibers are not generally recommended for the long term reinforcement of Portland cement or other cementitious products. The alkali content of the cementitous matrix attacks the E glass fiber surface and substantially weakens the fibers. This alkali attack and subsequent fiber strength loss generally so weakens the fibers that long term reinforcement of the matrix by the E glass fibers is neither predictable nor dependable.

In order to provide glass fibers for the reinforcement of cementitious products, alkali-resistant glass compositions containing zirconia have been developed. British Pat. No. 1,243,973 published on Aug. 25, 1971 with A. J. Majumdar named as inventor describes alkali resistant, fiberizable glass compositions containing $ZrO_2$ in amounts ranging from 10 to 20 percent by weight. British Pat. No. 1,290,528 published on Sep. 27, 1972 and assigned to Pilkington Brothers, Limited, discloses an alkali resistant glass composition containing, in molecular percentages, 7 to 11% of $ZrO_2$.

Another alkali resistant glass composition is disclosed in U.S. Pat. No. 3,499,776, issued on Mar. 10, 1970. It describes a bulk glass composition, which may or may not be fiberizable, and that contains, in mole percent, $ZrO_2$ in amounts ranging from 4 to 12 percent. Still another alkali resistant, fiberizable glass composition containing zirconia is disclosed in U.S. Pat. application Ser. No. 275,613 filed on July 27, 1972. The $ZrO_2$ and $TiO_2$ containing compositions described in application Ser. No. 275,613 provide a unique combination of alkali-resistance, low liquidus temperature and desirable viscosity for the fiberization of glass compositions and for the reinforcement of cementitious materials.

Zirconia free glass compositions which are resistant to alkali attack now have been discovered. In the glass compositions and glass fibers of this invention, zirconia has been replaced with titania ($TiO_2$), lanthana ($La_2O_3$) or ceric oxide ($CeO_2$).

Accordingly, an object of this invention is to provide fiberizable glass compositions.

Another object is to provide alkali resistant glass fibers.

Still another object is to provide a reinforced cementitious product.

Other objects, aspects and advantages of the invention will be apparent to one skilled in the art from the following disclosure and appended claims.

The glass compositions of this invention fall within the following range of proportions:

| Ingredient | Weight Percent | Mole Percent |
|---|---|---|
| $SiO_2$ | 55 to 65 | 65 to 70 |
| $TiO_2$, $La_2O_3$ or $CeO_2$ | 12 to 25 | 6 to 12 |
| CaO | 4 to 6 | 4 to 8 |
| $Na_2O$ | 12 to 18 | 14 to 20 |
| $K_2O$ | 0 to 3 | 0 to 3 |

It has been discovered that glass compositions falling within this range of proportions can be formed into fibers using commercial E glass melting and fiber forming techniques and at commercial E glass production rates. Also it has been found that glasses of this type will have a liquidus temperature so low, less than 1,555°F in some compositions, that devitrification of the molten glass prior to or during fiber forming can be ignored. This is a significant processing advantage in that devitrification can lead to costly and time consuming production shut downs.

As previously discussed, the prior art has developed alkali resistant glass compositions. Some of the best ones developed to date contain $ZrO_2$ in combination with $TiO_2$. The compositions of this invention contain $TiO_2$, $La_2O_3$ or $CeO_2$ and free of zirconia.

Commercial fiber forming processes are geared to melt the glass compositions at about 2,650° to 2,750°F and fiberize it at about 2,250° to 2,500°F. To avoid devitrification of the molten glass in the melting or fiberizing zone it is important that the liquidus or devitrification temperature of a glass be at least 50°F, and preferably 100°F or more, below the usual fiberizing temperature. Using the glasses of this invention devitrification problems are virtually eliminated.

The other key property of smooth running, commercial, fiber forming glasses is viscosity. Viscosities of $10^{2.50}$ poises at temperatures of 2,450°F or less and $10^3$ poises of 2,220°F or less are most desirable. The glass compositions of this invention easily meet this requirement.

Specific glass compositions embodying the principles of this invention are set forth in the following examples.

| Ingredient | Example I Weight Percent | Example I Mole Percent | Example II Weight Percent | Example II Mole Percent | Example III Weight Percent | Example III Mole Percent |
|---|---|---|---|---|---|---|
| $SiO_2$ | 63.8 | 66.6 | 56.7 | 66.6 | 61.3 | 69.2 |
| $TiO_2$ | 13.2 | 10.4 | — | — | — | — |
| $La_2O_3$ | — | — | 22.8 | 10.4 | — | — |
| $CeO_2$ | — | — | — | — | 16.4 | 6.3 |
| CaO | 5.4 | 6.0 | 4.8 | 6.0 | 5.0 | 6.0 |
| $Na_2O$ | 15.0 | 15.2 | 13.4 | 15.2 | 16.9 | 18.5 |
| $K_2O$ | 2.6 | 1.8 | 2.4 | 1.8 | — | — |
| Liquidus Temp., °F | Less than 1500 | | 2120 | | 2075 | |

—Continued

| Ingredient | Example I | | Example II | | Example III | |
|---|---|---|---|---|---|---|
| | Weight Percent | Mole Percent | Weight Percent | Mole Percent | Weight Percent | Mole Percent |
| Viscosity: Temp., °F at Log Poise | | | | | | |
| 2.00 | 2358 | | 2329 | | 2488 | |
| 2.50 | 2129 | | 2221 | | 2245 | |
| 3.00 | 1955 | | 2046 | | 2063 | |

The viscosity determinations in Examples I to III were obtained using the apparatus and procedure described in U.S. Patent No. 3,056,283 and in an article in *The Journal of the American Ceramic Society*, Vol. 42, No. 11, November, 1959, pages 537–541. The article is entitled "Improved Apparatus for Rapid Measurement of Viscosity of Glass at High Temperatures" by Ralph L. Tiede. Other spacific viscosity determinations referred to herein also would be measured by the apparatus and procedure in the Tiede article.

In the glass compositions of this invention $SiO_2$ is the primary glass forming ingredient. The alkali metal oxides $Na_2O$ and $K_2O$ are used to control viscosity. CaO is used primarily to control liquidus. It does this without adversely affecting the viscosity.

$TiO_2$, $La_2O_3$ or $CeO_2$ is the ingredient believed to be responsible for the alkali resistance of these glasses.

$Fe_2O_3$ and $Al_2O_3$ can enter these glass compositions as impurities of the batch raw materials. Preferably $Fe_2O_3$ should be maintained below about 0.5% by weight and $Al_2O_3$ should be maintained below about 1% by weight.

EXAMPLE IV

Tables 1 and 2 record the tensile strength retention of glass fiber strands of E glass and the glass of Example I.

E glass is a textile glass composition used for many years for the reinforcement of non-alkali matrices such as plastics. It is well known for its properties which allow it to be easily and economically fiberized in commercial quantities and at commercial rates using direct melt furnaces and fiberizing techniques. E glass typically is made up of the following ingredients, by weight percent:

| Ingredient | Weight Percent |
|---|---|
| $SiO_2$ | 54 to 55 |
| $Al_2O_3$ | 14 to 15 |
| RO (CaO & MgO) | 22 |
| $B_2O_3$ | 6 to 8 |
| $F_2$ | 0.5 to 1 |
| $R_2O$ ($Na_2O$) | 0.5 to 1 |
| $TiO_2$ & $Fe_2O_3$ | 0 to 1 |

Table 1

Tensile Strength Retention of E Glass

| Environment | Immersion Time | Solution Temp. | % Strength Retained |
|---|---|---|---|
| Air | — | — | 100 |
| Cement Solution | 8 hours | 148°F | 78.8 |
| Cement Solution | 24 hours | 148°F | 57.0 |
| Cement Solution | 48 hours | 148°F | 33.3 |
| Cement Solution | 96 hours | 148°F | 28.3 |
| Cement Solution | 144 hours | 148°F | 16.6 |

Table 2

Tensile Strength Retention of Glass of Example 1

| Environment | Immersion Time | Solution Temp. | % Strength Retained |
|---|---|---|---|
| Air | — | — | 100 |
| Cement Solution | 1 week | 148°F | 64.5 |

The procedure for obtaining the strength retention values of Tables 1 and 2 was essentially as follows. Each of the glass compositions was fiberized and coated with the same forming size. Fiber diameter was maintained in the range of 50 to 55 hundred thousandths of an inch. All strands had 52 filaments.

Strands of each glass were wound around and suspended between brass pegs spaced about 1 foot apart. These pegs and strands were then immersed in a synthetic cement solution having a pH of 12.4 to 12.5 and comprising an aqueous solution of 0.88 grams/liter of NaOH, 3.45 grams/ liter of KOH and 0.48 grams/liter of $Ca(OH)_2$. This cement solution is described in British Majumdar Pat. No. 1,243,973 and in an article by A. J. Majumdar and J. F. Ryder entitled "Glass Fibre Reinforcement of Cement Products" appearing at pages 78–84 of *Glass Technology*, Vol. 9 (3), June, 1968.

Polypropylene pans containing the solutions and immersed samples were covered and placed in ovens maintained at a temperature of 148°F for the indicated periods of time.

At the end of each time period, for example 1 week, the samples were removed from the cement solution, rinsed in tap water and dried in air. The samples in Tables 1 and 2 tested in an "air" environment were not immersed in the cement solution but exposed only to air, rinsed in tap water and dried in air.

After air drying of the samples their tensile strength was measured on a floor model Instron Universal testing machine, Model TTC, serial number 1680 at a gage length of 2.0 inches and a strain rate of 0.1 inch/inch/minute. For each time interval at least twenty strands of each glass were broken. The percentage of the strength retained by each glass in Tables 1 and 2 therefore represents an average of a least 20 tensile strength readings.

Comparing the strength of E glass with the strength of the glass of Example I clearly shows the superior alkali resistance of the Table 2 glass. The high degree of alkali resistance combined with the favorable fiberizing and liquidus temperatures, and liquidus-viscosity relationship of the glasses of this invention make them highly desirable. Their fiber forming characteristics make them as easy to work with as E glass, while their alkali resistance makes them suitable for reinforcing cementitious matrices.

EXAMPLE V

Glass fibers embodying the principles of this invention also have been incorporated in other kinds of cementitious products or matrices including cement, concrete and mortar. These fibers have resisted alkali attack and reinforced the products. Cementitious products also have been made which are reinforced with glass fibers of this invention in combination with other reinforcing materials such as asbestos fibers or wood fibers.

For example, a calcium silicate insulating material having a matrix of a tobermorite crystalline structure can be prepared by initially forming a slurry having a water to solids ratio of about 5.5 and a molar ratio of CaO to $SiO_2$ of about 0.8. The solids contained about 20 parts by weight of glass fiber strands of the glass of Example I. The resultant slurry is indurated in an atmosphere of superheated steam for a period of about 6.5 hours at a pressure of 225 p.s.i. and at a temperature of 190°C. The molded product is allowed to cool and can be dried by conventional means if necessary. The molded product will be found to be indurated in its original size and shape.

Modifications and variations within the scope of the attached claims are intended to be included.

I claim:

1. Fiberizable, alkali-resistant, zirconia free, glass compositions consisting essentially of:

|  | Mole Percent |
|---|---|
| $SiO_2$ | 65 to 70 |
| X | 6 to 12 |
| CaO | 4 to 8 |
| $Na_2O$ | 14 to 20 |
| $K_2O$ | 0 to 3 | wherein X is $TiO_2$, $La_2O_3$ or $CeO_2$ and wherein said compositions have a liquidus temperature of less than 2,200°F and a viscosity of $10^{2.50}$ poises at 2,450°F or less and $10^3$ poises at 2,220°F or less.

2. The fiberizable glass composition of claim 1, wherein the mole percent of each ingredient is:

|  | Mole Percent |
|---|---|
| $SiO_2$ | 66.6 |
| X | 10.4 |
| CaO | 6.0 |
| $Na_2O$ | 15.2 |
| $K_2O$ | 1.8 | wherein X is $TiO_2$ and the liquidus temperature is less than 1,500°F.

3. Alkali resistant, zirconia free, glass fibers consisting essentially of:

|  | Mole Percent |
|---|---|
| $SiO_2$ | 65 to 70 |
| X | 6 to 12 |
| CaO | 4 to 8 |
| $Na_2O$ | 14 to 20 |
| $K_2O$ | 0 to 3 | wherein X is $TiO_2$, $La_2O_3$ or $CeO_2$.

4. The glass fibers of claim 3 wherein the mole percent of each ingredient is:

|  | Mole Percent |
|---|---|
| $SiO_2$ | 66.6 |
| X | 10.4 |
| CaO | 6.0 |
| $Na_2O$ | 15.2 |
| $K_2O$ | 1.8 | wherein X is $TiO_2$.

* * * * *